(12) United States Patent
Heidrich et al.

(10) Patent No.: US 8,561,351 B2
(45) Date of Patent: Oct. 22, 2013

(54) SKIRT FOR SLIDE-GLIDE DOOR

(75) Inventors: Peter Heidrich, Des Plaines, IL (US); David C. Griffis, Round Lake, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 134 days.

(21) Appl. No.: 13/119,472

(22) PCT Filed: Apr. 22, 2009

(86) PCT No.: PCT/US2009/041377
§ 371 (c)(1),
(2), (4) Date: May 2, 2011

(87) PCT Pub. No.: WO2010/039286
PCT Pub. Date: Apr. 8, 2010

(65) Prior Publication Data
US 2011/0203180 A1    Aug. 25, 2011

Related U.S. Application Data

(60) Provisional application No. 61/102,129, filed on Oct. 2, 2008.

(51) Int. Cl.
*E06B 7/20* (2006.01)
(52) U.S. Cl.
USPC ............ 49/312; 49/303; 49/316; 49/321
(58) Field of Classification Search
USPC ............ 49/303, 304, 305, 311, 312, 316, 321
See application file for complete search history.

(56) References Cited

U.S. PATENT DOCUMENTS

| | | | | |
|---|---|---|---|---|
| 309,413 A * | 12/1884 | Smith et al. | | 49/303 |
| 451,641 A * | 5/1891 | Reed | | 49/311 |
| 542,007 A * | 7/1895 | Rudebock | | 49/311 |
| 719,657 A * | 2/1903 | Grover et al. | | 49/314 |
| 872,976 A * | 12/1907 | Smith | | 49/314 |
| 1,624,295 A * | 4/1927 | Watkins | | 49/312 |
| 1,912,561 A * | 6/1933 | Williams | | 49/314 |
| 2,813,315 A * | 11/1957 | Menzies | | 49/312 |
| 4,058,191 A | 11/1977 | Balbo | | |
| 4,614,060 A * | 9/1986 | Dumenil et al. | | 49/303 |
| 4,882,876 A | 11/1989 | Daugirdas | | |
| 5,332,279 A | 7/1994 | Golemis et al. | | |
| 7,143,546 B2 * | 12/2006 | Griffis et al. | | 49/308 |
| 2005/0121939 A1 | 6/2005 | Griffis et al. | | |

FOREIGN PATENT DOCUMENTS

| | | |
|---|---|---|
| CA | 2235456 | 10/1998 |
| WO | 0196132 A1 | 12/2001 |

* cited by examiner

*Primary Examiner* — Gregory J. Strimbu
(74) *Attorney, Agent, or Firm* — The Webb Law Firm

(57) ABSTRACT

A solid skirt seal mounted to the bottom edge of a slide-glide door panel hinged to rotate about an axis generally parallel to the bottom edge of the door panel, a spring biasing the hinged skirt seal to rotate the lower edge of the skirt seal in a downward direction, and a flexible cover extending between the lower edge of the skirt seal and the lower edge of the door panel.

6 Claims, 5 Drawing Sheets

SKIRT FOR SLIDE-GLIDE DOOR

BACKGROUND OF THE INVENTION

1. Field of the Invention

This invention relates to a seal skirt at the bottom of a slide-glide door panel of the type used in transit vehicles and the mechanism for raising and lowering the skirt as the door panel rotates from open to closed positions and from closed to open positions.

2. Description of Related Art

Slide-glide doors are well known in the art of transit vehicles, for example, buses. Normally, at least one door panel is arranged to cover a portion of the door opening. The door panel has top and bottom pivotal attachments to operating arms extending from a door post positioned at the edge of the door opening. The door posts are driven by a prime mover causing the arms to rotate inwardly away from the opening. The trailing edge of the door panels (when the door is being opened) is pulled into the vehicle guided by a track and the leading edge rotates outward so that when the operating arms have rotated approximately perpendicular to the opening, the door has moved perpendicular to the opening and generally inwardly of the opening. In some transit vehicles, the vehicle floor slopes downwardly to the bottom edge of the door panel. In this case, an accommodation must be made as the door is opened inwardly. This may take the form of a skirt seal movable relative to the bottom of the door. See, for example, U.S. Pat. No. 6,125,768 entitled "Door System for Transit Vehicle" and U.S. Pat. No. 7,143,546 entitled "Sealing Arrangement for a Transit Vehicle."

The above-referenced patent accommodates the sloped floor without bending or deformation of the door panel. It does so through the use of a helical cam which interfaces with the lower operating arm. Upon rotary motion of the lower door arm relative to the door panel, the helical cam slides a sealing skirt up or down in a path generally parallel to the face of the door panel. To be visually pleasing, this arrangement requires the use of covers on both the inside and the outside of the door. The disclosure of U.S. Pat. No. 7,143,546 is incorporated herein by reference for showing the general arrangement of slide-glide doors in transit vehicles and the operation of such doors when the panels move from the closed to open positions.

Canadian Patent No. 2235456 entitled "Swinging Door Leaf for Vehicles" discloses a swinging door with a sealing strip attached to the lower edge wherein the sealing strip is made entirely of a rubber-elastic material or a synthetic material. The sealing strip has a weak point in the thickness of the sealing strip wherein the sealing strip is rotated about the weak point. Rotation of the door to the open position causes the sealing strip to be raised from the floor by positive mechanical action, however, the return to the sealing position when the door closes entirely relies on the sealing strip falling into place. Moreover, a pocket formed to receive the sealing strip is exposed when the door is opened and is not positively sealed when the door is closed. The accumulation of dust in the pocket could degrade operation.

SUMMARY OF THE INVENTION

Briefly, according to one embodiment of this invention, a slide-guide door for a transit vehicle comprises at least one door panel for being planar with the door opening. A door post is journaled in the vicinity of the edge of the door opening. At least one operating arm rotating with the post is pivotally connected to the door panel. A follower extending from near the leading edge of the door panel engages the guide track. A prime mover is provided for rotating the door post and operating arm such that as the operating arm swings inward of the vehicle to a position generally perpendicular to the door opening, the door panel rotates outwardly to a position generally perpendicular to the door opening. A solid, e.g., metal, skirt seal mounted to the bottom edge of the door panel is hinged to rotate about an axis generally parallel to the bottom edge of the door panel. The hinge axis is above the operating arm adjacent the lower edge of the door panel and having a portion spaced inwardly of the door panel when in the closed position by a bracket fixed to the door panel for supporting the hinged connection between the door panel and the skirt seal. A spring biases the hinged skirt seal to rotate the lower edge of the skirt seal in a downward direction. A flexible cover extends between the lower edge of the skirt seal and the lower edge of the door panel. The above-described elements are arranged such that when the operating arm pulls the door panel to an open position, it pushes the skirt seal to rotate outward and away from the vehicle floor, simultaneously collapsing the flexible cover.

It is an advantage, according to this invention, that positive mechanical action positions the skirt seal both when opening and closing the door panel making the use of sensors or other power actuators unnecessary. The pivoting motion of the skirt seal results in a better seal than stationary brushes. When the door panel is in the closed position, the flexible cover, then straightened out, provides a clean appearance. The skirt seal completely covers the operating arm, eliminating a pocket that is present on other slide-glide door systems. This also eliminates the need for a pocket seal.

It is a further advantage that the skirt seal rotates away from the vehicle interior and the vehicle floor avoiding binding with the floor.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
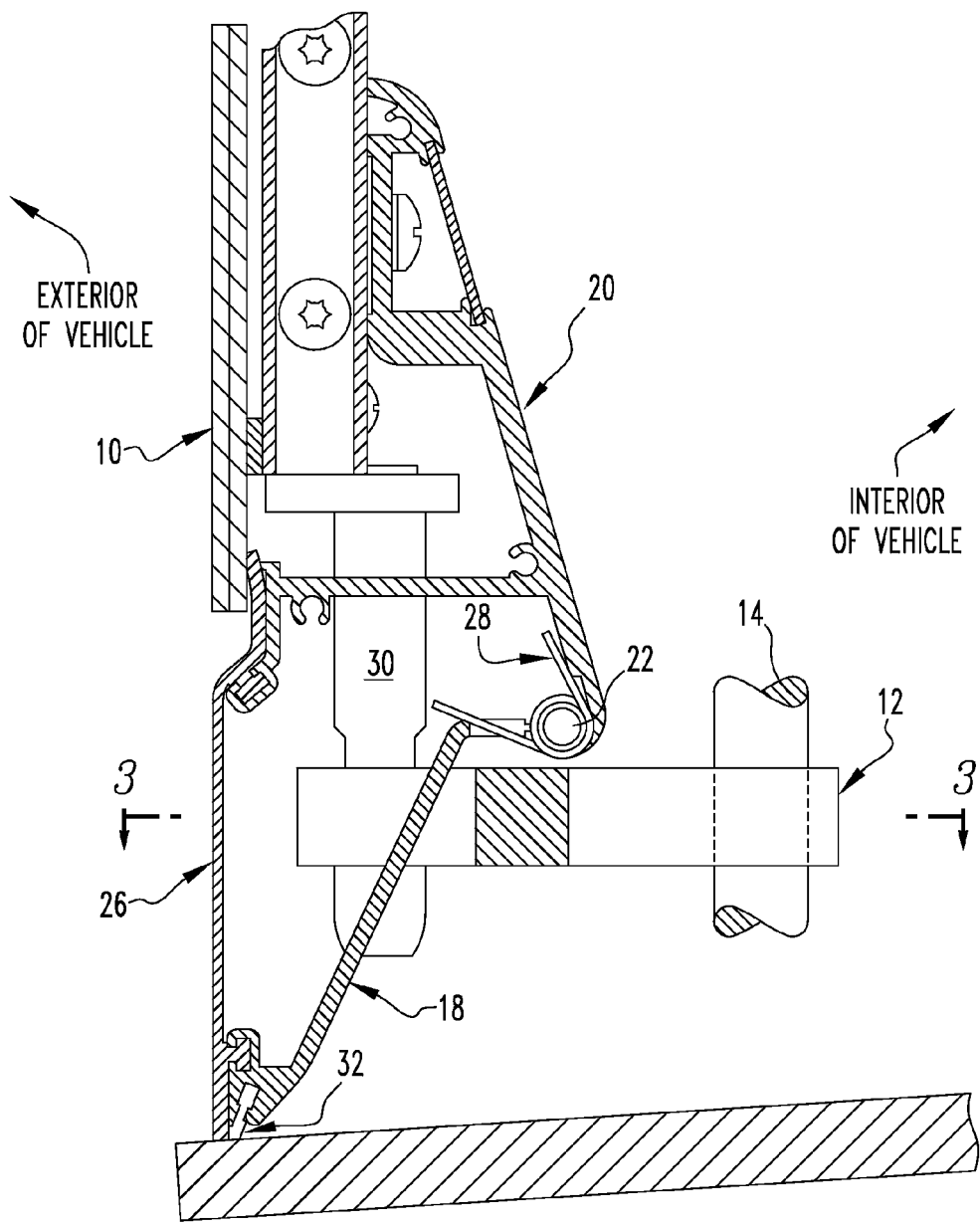
FIG. 1 is a schematic section view through one embodiment of this invention showing the skirt seal in the closed position.
Figure 2:
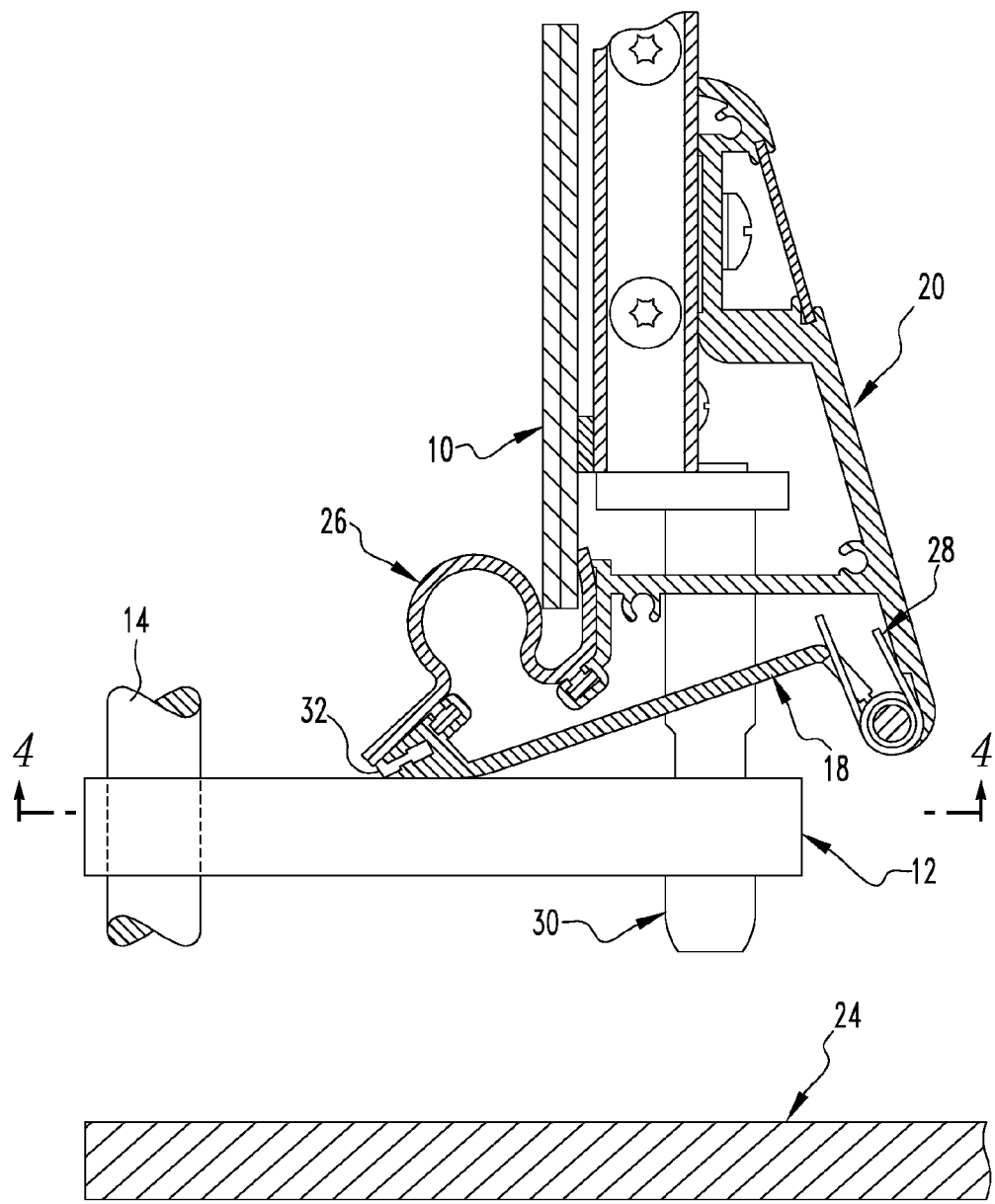
FIG. 2 is a schematic section view looking perpendicular to the door opening when the door in its open position.
Figure 5:
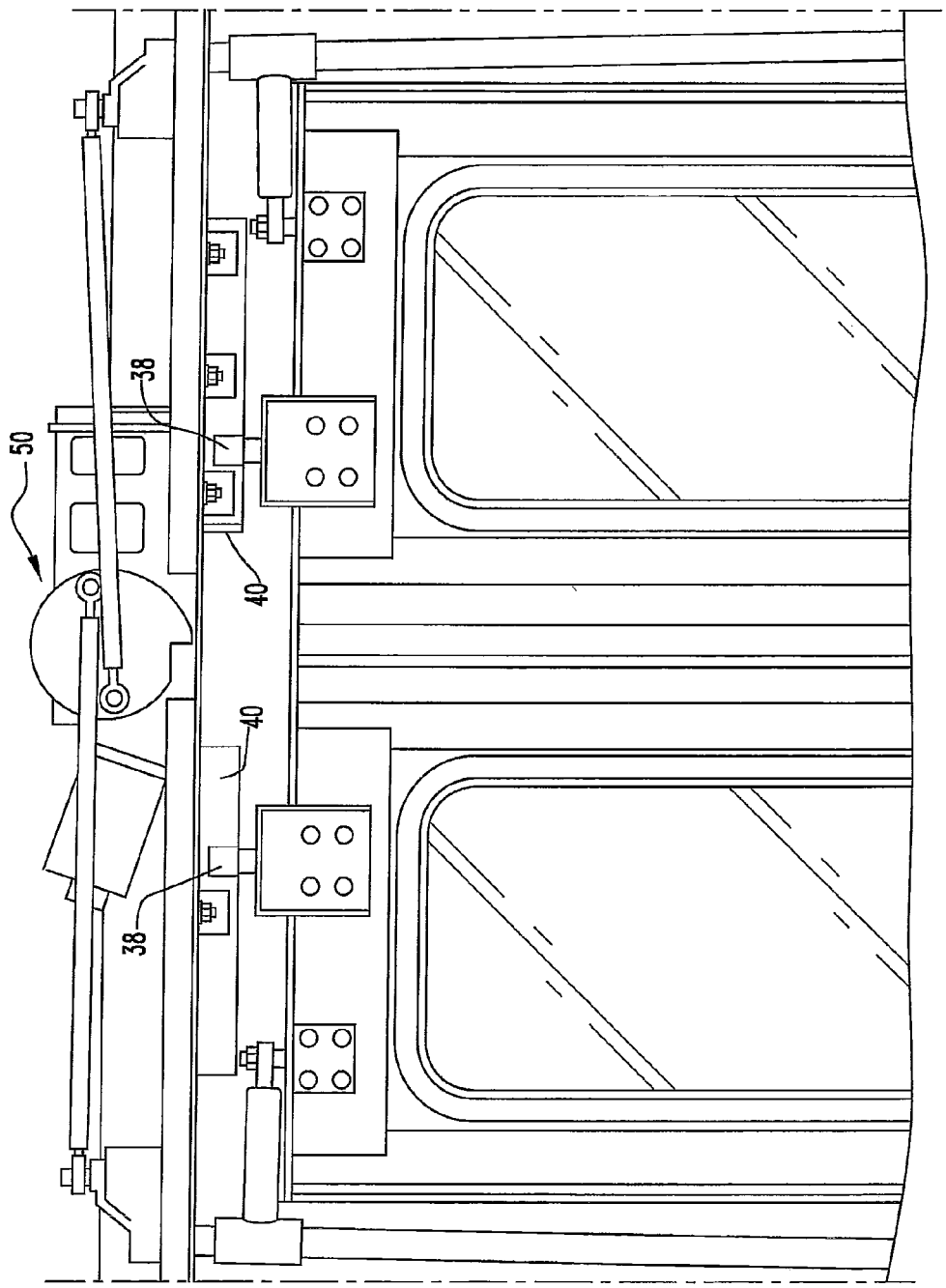
FIG. 5 is a view of the top edge of a typical prior art slide-glide door illustrating the guide track, follower, and prime mover.

Referring to FIGS. 1 and 2, there is provided a slide guide door for a transit vehicle of the type comprising at least one door panel 10 for being planar with the door opening, a door post in the vicinity of the edge of the door opening (not shown), at least one operating arm 12 rotating with a post 14, and a pivotal connection 16 between the operating arm and the door panel. As is well understood in the art and as shown in FIG. 5, a guide track 40 is positioned near the top edge of the door panel and a follower 38 extends from near the leading edge of the door panel (when moving to the open position) engaging the guide track. As is well known, a prime mover 50 is provided for rotating the door post and operating arm such that as the operating arm swings inwardly to a position generally perpendicular to the door opening, the door panel rotates outwardly to a position generally perpendicular to the door opening.

According to one embodiment of this invention, a metal skirt seal 18 is mounted to the bottom edge of the door panel 10 hinged to rotate about an axis generally parallel to the bottom edge of the door panel. A bracket 20 fixed to the door panel supports the hinged connection between the door panel and the skirt seal. The bracket has spaced bores that align with spaced bores in the skirt seal with a hinge pin 22 extending through the bores as is typical of sturdy industrial hinges. The skirt seal is sized to extend from the bracket 20 to the floor 24 of the vehicle when the door is in the closed position. The axis of the hinge pin 22 is positioned by the bracket 20 spaced from the door panel. Thus, when the door panel is in the closed position, as shown in FIG. 1, and the lower edge of the skirt seal is abutting the floor, the skirt seal forms an acute angle with the floor. A flexible cover 26 is trapped between the lower edge of the door panel and the lower edge of the skirt seal such that the flexible cover is flat and substantially vertical. The flexible cover is trapped in T-slots at each horizontal edge. The flexible cover is a weather-resistant elastomer, such as rubber. A torsion spring 28 is wrapped on the hinge pin and biases the lower edge of the skirt seal downwardly.

A door pin 30 is pendent from the bottom of the door panel with an axis generally parallel with the axis of the door post. The pin extends downwardly below the hinge pin 22 sufficiently for an operating arm to be journaled on the pin. The operating arm extends parallel to the lower edge of the door panel between the pin 33 and the door post 14 to which it is fixed. Thus, when the door post is rotated, the operating arm engages the skirt seal to rotate the skirt seal up away from the floor.

The operating arm 12 is the driving member of the lower portion of the door. The operating arm typically rotates 180 degrees about a pin 30 fixed to the door and part of a pivotal connection 16.

Figure 3:
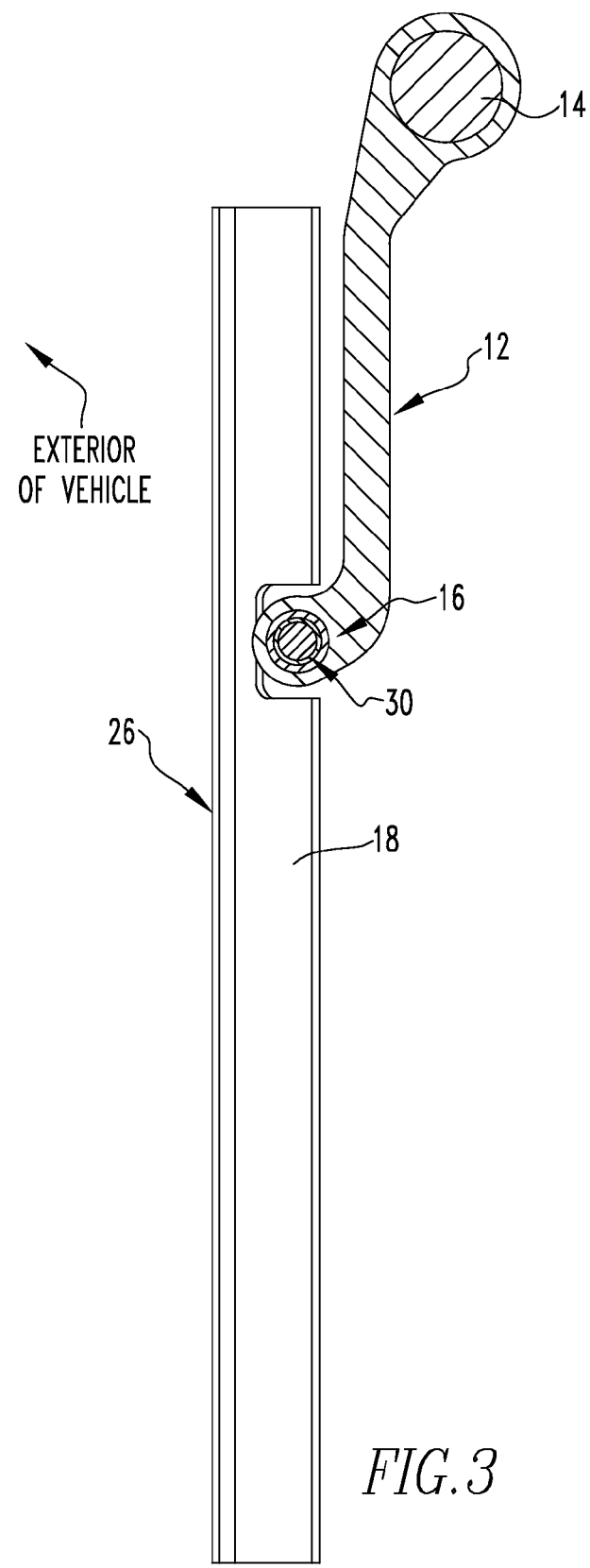
FIG. 3 is a section view taken along line 3-3 in FIG. 1.
Figure 4:
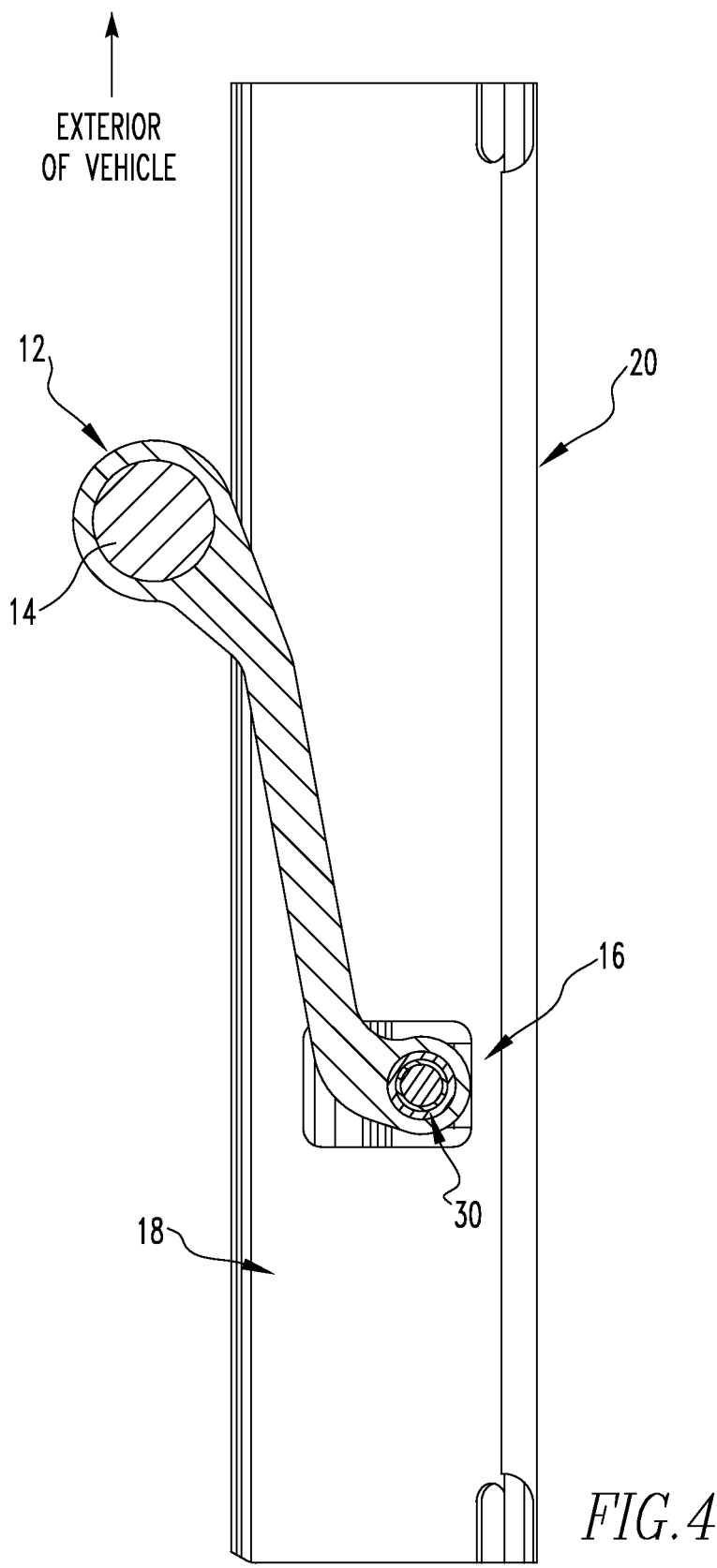
FIG. 4 is a section view taken along line 4-4 in FIG. 2.

Upon opening the door, the rotating operating arm 12 contacts the inside of the skirt seal 18, causing it to rotate upward and outward as shown in FIGS. 2 and 4. The flexible cover 26 deforms as shown in FIG. 2. The torsion spring urges the skirt seal to press against the operating arm as long as it is in contact with the arm. Just before the door fully closes, the operating arm loses contact with the skirt seal allowing it to rotate downward and press the flexible cover toward the floor. The flexible cover completely covers the bottom of the door keeping out contaminants from the interface between the skirt seal and the bracket as shown in FIGS. 1 and 3.

In a preferred embodiment, the end of the skirt seal may have a short brush 32 to accommodate an uneven floor surface, such as a ribbed floor.

The pivoting motion of the skirt seal eliminates interferences between the seal and the transit vehicle's sloped floor when the slide-glide door is open and the door panel is disposed within the interior of the transit vehicle. If the same door had stationary brushes between the lower edge of the door panel and the floor, the brushes would become permanently splayed, thereby reducing the ability of the brushes to seal the bottom edge of the door.

Having thus described our invention with the detail and particularity required by the Patent Laws, what is desired protected by Letters Patent is set forth in the following claims.

The invention claimed is:

1. In a slide-guide door for a door opening in a transit vehicle, said opening having substantially vertical edges, said slide-guide door comprising at least one door panel having a top edge and a bottom edge, said door panel being coplanar with the door opening when in a closed position, a door post adjacent one of said edges of the door opening, at least one operating arm mounted on and rotatable with the post, the operating arm being pivotally connected to the door panel via a pin pendent from the bottom edge of the door panel, a guide track adjacent the top edge of the door panel, a follower extending from the top edge of the door panel and engaging the guide track, a prime mover for rotating the door post and operating arm, such that as the operating arm swings inward with respect to the vehicle to a position generally perpendicular to the door opening, the door panel rotates outwardly to an open position generally perpendicular to the door opening, the improvement comprising:

said pin having a longitudinal axis parallel with a longitudinal axis of the door post, a solid skirt seal mounted to the bottom edge of the door panel via a hinged connection which enables the skirt seal to rotate about a hinge axis generally parallel to the bottom edge of the door panel, said hinge axis being above the operating arm, said operating arm being adjacent the bottom edge of the door panel, said operating arm having a portion spaced inwardly of the door panel with respect to the vehicle when the door panel is in the closed position; and a bracket fixed to the door panel and supporting the hinged connection between the door panel and the skirt seal;

the operating arm and skirt seal being arranged such that when the operating arm is swung to the position generally perpendicular to the door opening, the operating arm pulls the door panel to the open position and the operating arm pivots the skirt seal away from a floor of the vehicle and outward from an interior of the vehicle and simultaneously collapses a flexible cover extending between the door panel and skirt seal.

2. The improvement of claim 1, further comprising a spring biasing the skirt seal to rotate toward the floor of the vehicle.

3. The improvement of claim 1, further comprising the flexible cover extending between a bottom edge of the skirt seal and the lower edge of the door panel.

4. The improvement of claim 3, wherein the skirt seal and the flexible cover define a space.

5. The improvement of claim 1, wherein the skirt seal has a brush to accommodate unevenness in the floor of the vehicle.

6. The improvement of claim 1, wherein the flexible cover comprises a weather-resistant elastomer.

* * * * *

UNITED STATES PATENT AND TRADEMARK OFFICE
CERTIFICATE OF CORRECTION

PATENT NO. : 8,561,351 B2  
APPLICATION NO. : 13/119472  
DATED : October 22, 2013  
INVENTOR(S) : Heidrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 163 days.

Signed and Sealed this

Fifteenth Day of September, 2015

Michelle K. Lee
*Director of the United States Patent and Trademark Office*